Oct. 31, 1950 — C. C. BUCKELS — 2,528,418
ADJUSTABLE MOUNTING SUPPORT FOR OUTLET BOXES
Filed Oct. 18, 1945
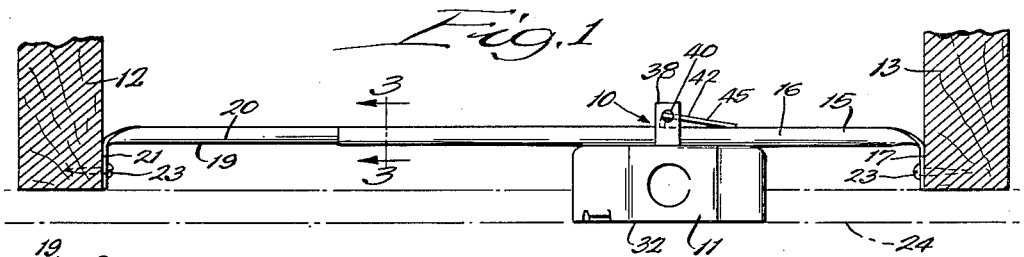
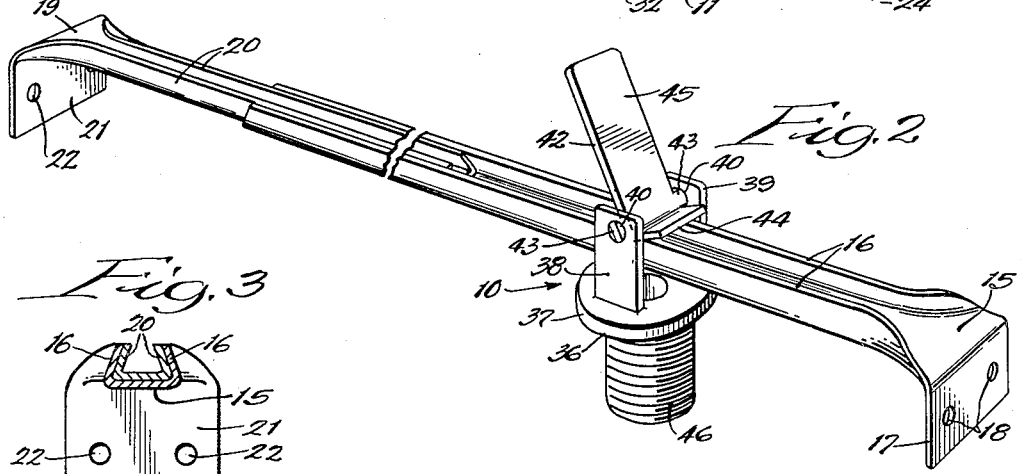
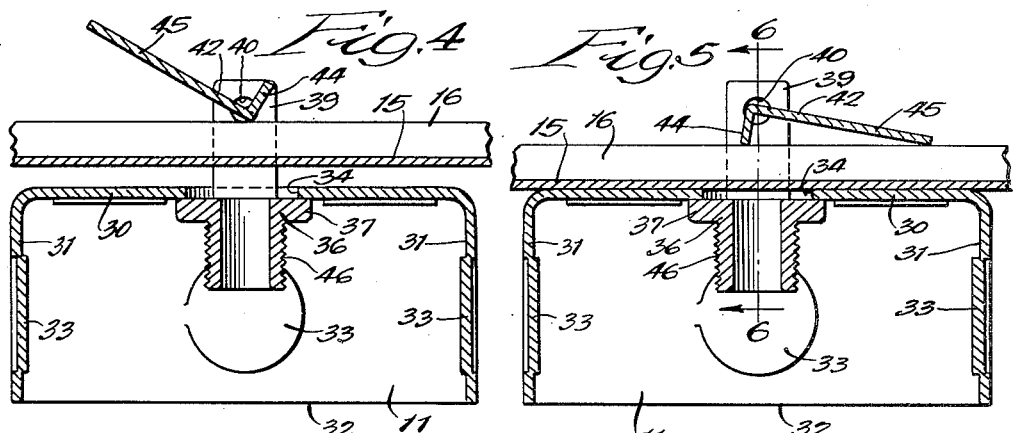
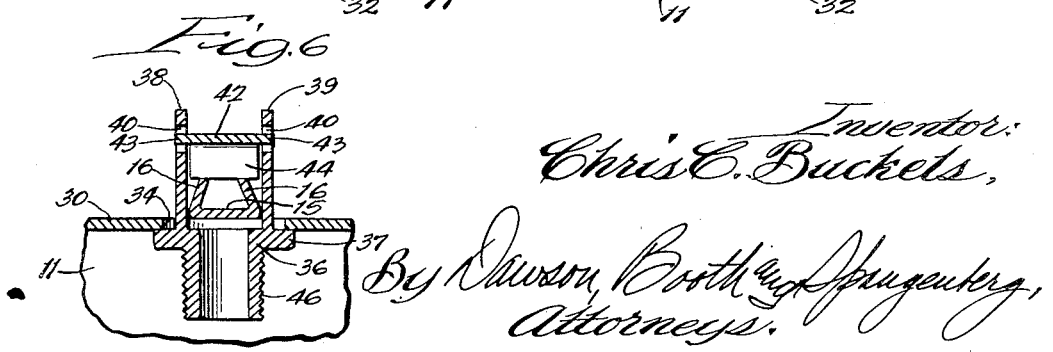
Inventor: Chris C. Buckels,
By Dawson, Booth and Spangenberg,
Attorneys.

Patented Oct. 31, 1950

2,528,418

UNITED STATES PATENT OFFICE 2,528,418

ADJUSTABLE MOUNTING SUPPORT FOR OUTLET BOXES

Chris C. Buckels, Chicago, Ill., assignor to Henry Hildebrandt, Chicago, Ill.

Application October 18, 1945, Serial No. 623,001

5 Claims. (Cl. 248—57)

1

This invention relates to adjustable mounting supports for outlet boxes.

The principal object of this invention is to provide an improved adjustable mounting support for outlet boxes wherein the outlet box may be mounted at any desired point between a pair of joists and wherein it may be mounted flush with the surface of the wall including the joists, and wherein variable spacing between the joists may be readily and adjustably taken care of.

In carrying out the principal object of the invention the adjustable mounting support includes a pair of telescopic members for adjustably accommodating the variable spacing between joists and which are provided with flanges for securing the telescopic members to and between the joists. Preferably the flanges are of such depth that when they are lined up with the corners of the joists, the open side of the outlet box, secured to the telescopic member, will be flush with the surface of the finished wall including the joists. Also, a clamping device is utilized for readily and securely clamping the outlet box at any desired position along the telescopic members between the joists.

Further objects of the invention reside in the details of construction of the adjustable mounting support which makes possible the foregoing advantages and features.

Other objects and advantages will become apparent to those skilled in the art upon reference to the accompanying specification, claims, and drawing in which—

Fig. 1 is an elevational view of the adjustable mounting support mounting the outlet box between a pair of joists;

Fig. 2 is an enlarged perspective view of the adjustable mounting support;

Fig. 3 is an enlarged sectional view taken substantially on the line 3—3 of Fig. 1;

Fig. 4 is an enlarged partial sectional view through the outlet box and the adjustable mounting support showing the parts in unclamped position;

Fig. 5 is an enlarged partial sectional view similar to Fig. 4 showing the parts in clamped relation; and Fig. 6 is a partial sectional view taken substantially along the line 6—6 of Fig. 5.

Referring first to Fig. 1, the adjustable mounting support is generally designated at 10 for mounting an outlet box 11 between joists 12 and 13.

The adjustable mounting support includes a

2 pair of telescopic members. One of the members is designated 15 and it is in the form of a channel member having side walls 16 disposed at acute angles. The member 15 is also provided with a flange 17 having holes 18. The flange 17 is adapted to abut against one of the joists as for example joist 13 of Fig. 1.

The other telescopic member 19 is also of channel form including side walls 20 disposed at acute angles which are adapted to be telescopically received within the side walls 16 of the member 15. The member 19 also includes a flange 21 provided with suitable securing holes 22. The flange 21 is adapted to abut against a joist such as the joist 12 of Fig. 1.

Because of the telescopic relation between the members 15 and 19, the support may be elongated or contracted to fit between the joists 12 and 13 and when properly adjusted may be secured to the joists 12 and 13 by means of nails or screws 23 extending through the holes 18 and 22 of the flanges 17 and 21 respectively. This telescopic construction provides a rigid support between the joists 12 and 13 for the outlet box 11 and is at the same time adapted to wide variations in the distance between the joists 12 and 13. It will be noted that the member 15 is somewhat longer than the member 19 which provides for larger variations in the overall length of the supporting member.

The flanges 17 and 21 are of such depth that when they are lined up with the corners of the joists 12 and 13 the open side of the outlet box secured to the telescopic members will be flush with the surface of the finished wall 24 formed on the joists 12 and 13. In other words, the depth of the flanges 17 and 21 is substantially equal to the depth of the outlet box minus the thickness of the wall construction formed on the joists 12 and 13. Therefore, by lining up the flanges 17 and 21 with the corners of the joists, the outlet box 11 is properly located with respect to the surface of the finished wall.

The outlet box 11 is of conventional form and includes a back wall 30, side walls 31, and an open front face 32. The outlet box is also provided with the usual knockouts 33. In mounting the junction box 11 the central knockout is ordinarily removed to form the knockout hole 34 in the back wall of the outlet box.

The outlet box 11 is clamped to the telescopic members 15 and 20 by means of a clamping device 36. The clamping device 36 is provided with a flange 37 for engaging the inner surface of the back wall 30 of the outlet box adjacent the knockout hole 34 and it also includes a pair of spaced arms 38 and 39 which are adapted to project through the knockout hole 34 and straddle the telescopic members 15 and 19. The outer extremities of the arms 38 and 39 are provided with holes 40 to receive a clamping member 42. The clamping member 42 is provided with projections 43 which extend into the holes 40 in the arms 38 and 39 so that the clamping member 42 is pivotally mounted on the arms 38 and 39. The clamping member 42 includes a gripping portion 44 and a handle portion 45 extending at right angles with respect to each other.

With the clamping member 42 in the position shown in Fig. 4, the outlet box 11 is separated from the telescopic members 15 and 19 so that the outlet box 11 may be adjustably positioned on the telescopic members 15 and 19 to any desired position. When the correct position is attained the handle portion 45 is moved from the position shown in Fig. 4 to the position shown in Fig. 5, whereupon the gripping portion 44 engages and digs into the telescopic members 15 and 19 to forcibly clamp the back wall 30 of the outlet box 11 to the telescopic members 15 and 19. It will be seen from Fig. 5 that the gripping portion 44 is moved beyond dead center and that the handle portion 45 is engaging the telescopic member 15. Because of this over-center action, the clamping member 42 is positively located in the position shown in Fig. 5 for rigidly clamping the outlet box to the telescopic member 15.

Preferably the gripping member 44 is made of harder material than the telescopic members 15 and 19 so that the strain and force set up by the over-center action of the clamping member 42 results in a slight indentation in the telescopic members 15 and 19 which further assists in positively maintaining the outlet box 11 in the correct position on the telescopic members 15 and 19.

Ordinarily, only one clamping operation is performed in the above manner for after the outlet box 11 is once clamped in place there is practically never any need for changing its location. However, if it should be desired to change the location the clamping member 42 may be moved by the handle portion 45 to the position shown in Fig. 4 and then the outlet box 11 may be relocated and clamped in a different location.

The clamping device 36 may be provided with a screw threaded extension 46 for supporting the usual light fixture.

From the above it will be seen that the adjustable mounting support of this invention provides an arrangement wherein the outlet box may be adjustably mounted at any desired point between a pair of joists, wherein it may be mounted flush with the surface of the wall including the joists, and wherein variable spacing between the joists is readily and adjustably taken care of.

While for purposes of illustration one form of this invention has been disclosed, other forms thereof may become apparent to those skilled in the art upon reference to this disclosure, and therefore this invention is to be limited only by the scope of the appended claims and prior art.

I claim as my invention:

1. An adjustable mounting support for mounting an outlet box between a pair of joists comprising, a member to extend between the joists, and a clamping device to clamp the outlet box to the member at any desired point between the joists and having spaced arms to extend through a knockout hole in the outlet box and on both sides of the member, a flange to engage the interior of the outlet box adjacent the knock-out hole, and a clamp pivoted on the arms to clamp the outlet box between the flange and the member.

2. An adjustable mounting support for mounting an outlet box between a pair of joists comprising, a pair of telescopic members each having a flange for attachment to a joist, a clamping device to clamp the outlet box to the members at any desired point between the joists and having spaced arms to extend through a knock-out hole in the outlet box and on both sides of the members, a flange to engage the interior of the outlet box adjacent the knockout hole, and a clamp pivoted on the arms to clamp the outlet box between the flange and the members.

3. A clamping device for clamping an outlet box to a member comprising, spaced arms to extend through a knock-out hole in the outlet box and on both sides of the member, a flange to engage the interior of the outlet box adjacent the knock-out hole, and a clamp pivoted on the arms to clamp the outlet box between the flange and the member.

4. A clamping device, for clamping an outlet box to a member comprising, spaced arms to extend through a knock-out hole in the outlet box and on both sides of the member and having holes adjacent their outer ends, a flange to engage the interior of the outlet box adjacent the knock-out hole, and a clamp having projections extending into the holes of the spaced arms, a gripping portion to engage the member and a handle portion to move the gripping portion for clamping the outlet box between the flange and the member.

5. An adjustable mounting support for mounting an outlet box between a pair of joists comprising, a pair of members, one of which is telescopically received within the other to form a two piece support adjustable in length, and a clamping device for clamping the outlet box to the members and including a pivoted clamp of harder material than the members for engaging the members to deform the same.

CHRIS C. BUCKELS.

REFERENCES CITED

The following references are of record in the file of this patent:

UNITED STATES PATENTS

| Number | Name | Date |
|---|---|---|
| 625,020 | Chappius | May 16, 1899 |
| 1,332,690 | Rosenfeld | Mar. 2, 1920 |
| 1,805,027 | Adell | May 12, 1931 |
| 1,812,756 | Riggs | June 30, 1931 |
| 1,856,356 | Owen | May 3, 1932 |
| 2,233,334 | Austin | Feb. 25, 1941 |
| 2,316,389 | Atkinson | Apr. 13, 1943 |